Figure 8:
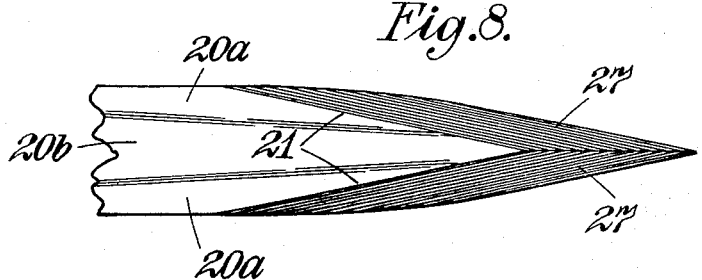

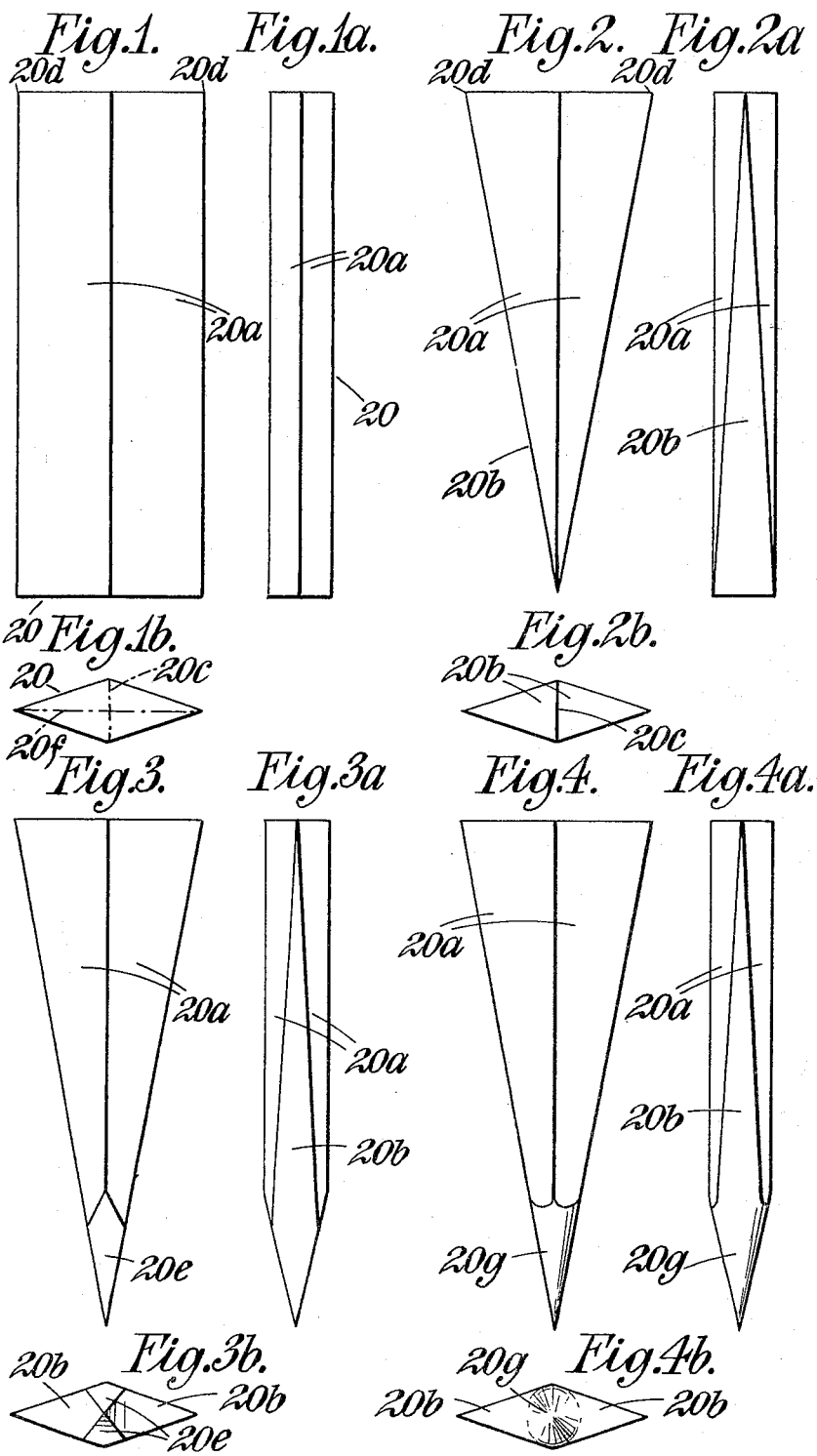

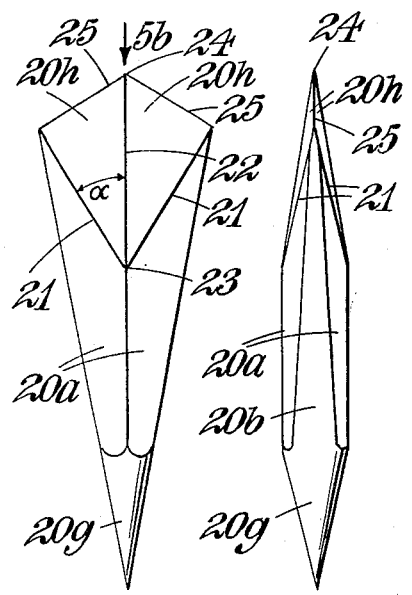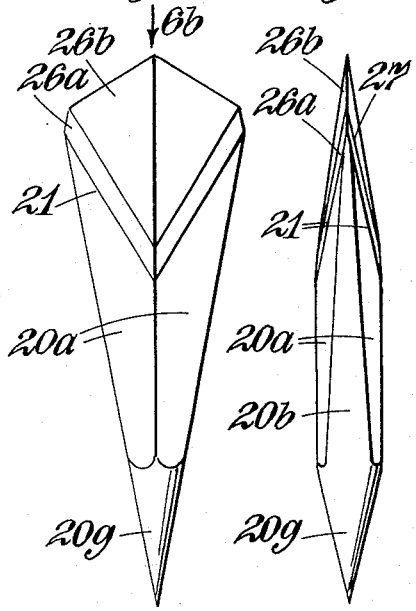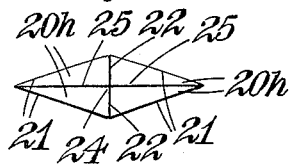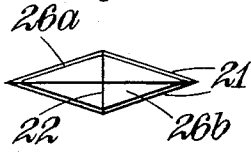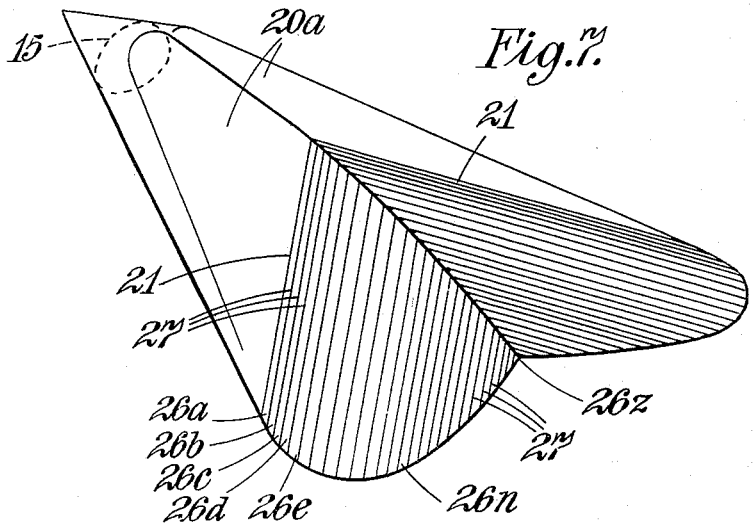

United States Patent Office 2,998,947
Patented Sept. 5, 1961

2,998,947
SUPERSONIC NARROW DELTA AIRCRAFT CONSTRUCTION
Alan Arnold Griffith, Derby, England, assignor to Rolls-Royce Limited, Derby, England, a British company
Filed Aug. 29, 1958, Ser. No. 758,161
Claims priority, application Great Britain Sept. 6, 1957
5 Claims. (Cl. 244—117)

This invention comprises improvements in or relating to aircraft and is concerned more particularly with aircraft designed for flight at supersonic speeds and of the narrow Delta type.

The study of the narrow delta type of supersonic jet-lift aircraft has now reached a point where the most serious obstacle to further progress is aerodynamic ignorance. The precise nature of the difficulty is that the designer has no reliable theoretical or experimental guide to the profile shapes which are needed to optimize the lift/drag ratio.

Present theories are based on the linearized equations of motion and in relation to the designer's problem they are defective in two respects. In the first place, certain experiments by Love ("Investigations at supersonic speeds of 22 triangular wings representing two aerofoil sections for each of 11 apex angles." NACA-RM-L9D07, ARC-13759, 1949) and Herbert ("Free flight measurements at supersonic speeds of the drag of a particular delta wing having a simple pressure distribution." ARC-CP-57, 1950), who employed between them three distinct experimental techniques, have given drags which are much below those predicted by a linear theory and, clearly, failure to predict the best results must make the theory unreliable for predicting the best shape. In the second place, application of the theory to narrow deltas yields a rapid change of drag coefficient with Mach number which is not observed experimentally.

I have concluded that, in three-dimensional problems, freedom from transonic flow cannot be ensured merely by the condition that the flight Mach number is sufficiently far from unity, and thus that a possible reason for the failure of the linear theory of delta wings is the occurrence of transonic flow which would make the equations nonlinear.

The present invention is based upon my theory that if the problem of the flow over a thin wing is soluble by means of the linearized equations, then at any point of the surface the flight velocity can be resolved in the directions of the two principal axes of curvature and the effect of each element of curvature separately can be determined, the total effect being then obtained by summation. If, however, in applying this method it is found that one of the two components is transonic then the problem is nonlinear and the linearized solution is invalid. In general, therefore, the linear approximation is expected to be valid only for those parts of the wing where neither axis of curvature approaches the Mach direction too closely.

Consider now a narrow Delta aircraft and let the forebody be defined as that part of the surface which faces forwards and the afterbody as that which faces backwards. Then the boundary between the two is the locus of maximum thickness of the chordal profiles. Applying the test of the previous paragraph, the forebody should be suitable for linear treatment provided that, (a) the flight Mach number is not close to unity and (b) the leading edge is sufficiently far behind the Mach cone through the apex.

On the afterbody, on the other hand, it is often found that there are regions where one axis of curvature coincides with the Mach direction, so that linear theory cannot then be used for the afterbody. I have therefore concluded that, in those instances where the experimental drag has been found to be much less than that predicted by linear theory, the difference is due to the occurrence of transonic flow on the afterbody, and that the optimum afterbody is the one which most effectively exploits transonic flow.

According to the present invention, therefore, a narrow Delta aircraft has its afterbody so shaped as to provide the greatest possible measure of transonic flow at the design Mach number.

Preferably, the aircraft also has its forebody designed by means of Ward's slender body theory.

According to a feature of the present invention, an aircraft of the narrow Delta type has its afterbody built up of plane surfaces with their generators parallel to the Mach lines.

In one simple form of afterbody for a supersonic narrow Delta aircraft having a forebody whereof the drag is calculable by the linear theory, the forebody is a prism of substantially diamond section adjacent its junction with the afterbody, and the afterbody is defined by four planes continuing rearwardly from the plane surfaces of the adjacent portion of the forebody to a trailing edge of the aircraft, each plane of the afterbody intersecting the respective plane surfaces of the forebody in a ridge inclined to the fore and aft axis of the aircraft at the Mach angle, and the two planes forming the upper surface (and likewise the two forming the lower surface) of the afterbody meeting on a line extending from the intersection of the ridges to a point on the fore and aft axis of the aircraft.

It can be shown mathematically that with this simple form of afterbody the flow over the afterbody is to a major extent transonic, there being a Prandtl-Meyer expansion round each ridge followed by compression through an inclined shockwave.

In another form, in order to reduce the angle through which the aircraft surface turns at the ridges defining the boundary between the forebody and afterbody, the surface of the afterbody between the boundary of each plane surface of the forebody and the trailing edge of the aircraft, is formed in two or more of rearwardly successive planes which meet one another in ridge lines making an angle to the aircraft fore and aft axis equal to the Mach angle, it being arranged that each ridge line does not intersect the preceding shockwave. In this way an afterbody may be obtained approximating to one composed of four portions of a circular cylinder arranged so that each touches the respective plane surface of the forebody along a line making an angle to the fore and after axis equal to the Mach angle. In practice, the afterbody may be composed of the four circular cylindrical surfaces to which the planes approximate.

Some embodiments of this invention will now be described with reference to the accompanying drawings in which:

FIGURES 1 to 4b illustrate stepwise and geometrically the production of a suitable form for the forebody of a supersonic narrow delta aircraft, FIGURES 1, 1a and 1b showing the initial body shape in plan, side elevation and end elevation respectively, FIGURES 2, 2a, and 2b being corresponding views after a first modifying step, FIGURES 3, 3a, 3b being corresponding views after a second modifying step and FIGURES 4, 4a, 4b being corresponding views after a third modifying step.

Figure 9:
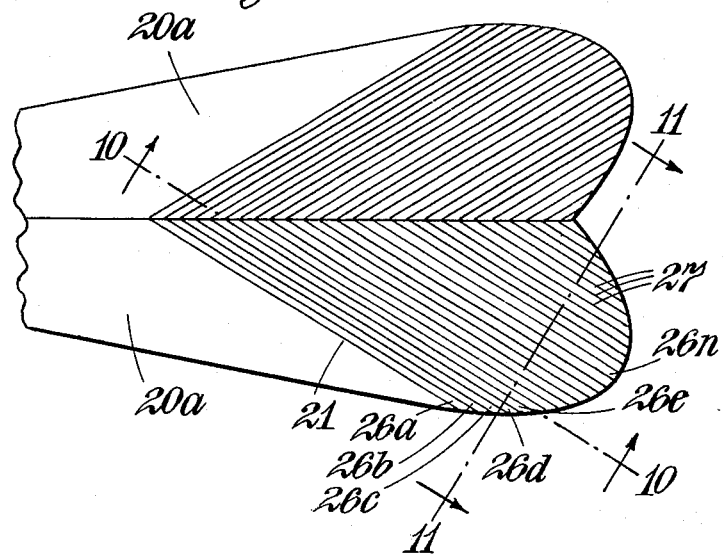
Figure 10:
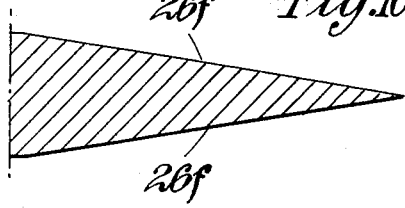
Figure 11:
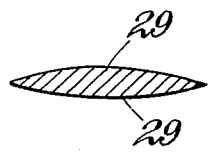

FIGURES 5, 5a, 5b are views corresponding to FIGURES 1, 1a, 1b of an aircraft provided with one form of afterbody of this invention, FIGURES 6, 6a, 6b show another embodiment of aircraft, FIGURE 7 is a perspective view of yet another aircraft with an afterbody of this invention, FIGURE 8 is a side elevation of the rear portion of the aircraft shown in FIGURE 7, FIGURE 9 is a plan view of FIGURE 8, FIGURES 10 and 11 are sections on the lines 10—10, 11—11 of FIGURE 9.

Figure 12:
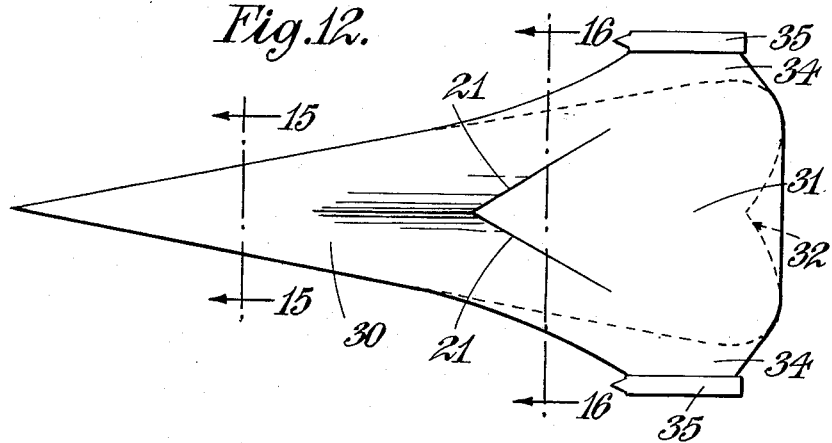
Figure 13:
Figure 14:
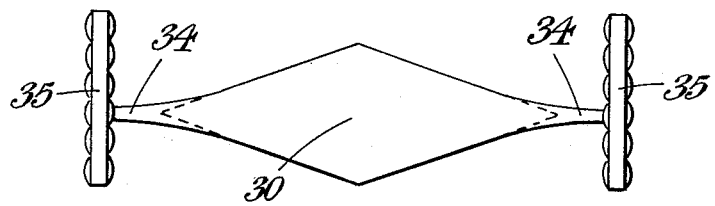
Figure 15:
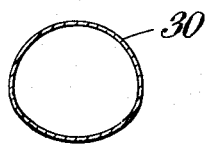
Figure 16:
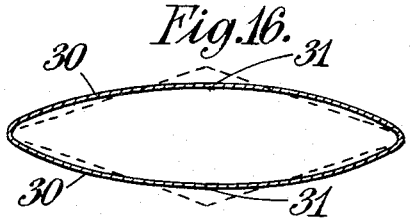

FIGURE 12 is a plan view of yet another form of aircraft having an afterbody in accordance with this invention, FIGURE 13 is a side elevation of FIGURE 12, FIGURE 14 is a front elevation of FIGURE 12, and FIGURES 15 and 16 are sections on the lines 15—15 and 16—16 of FIGURE 12.

Referring to FIGURES 1 to 4b, the forebody of a narrow delta aircraft is formed geometrically as follows. Starting with a prism 20 (FIGURES 1, 1a, 1b) of diamond cross-section which has four plane surfaces 20a parallel to the fore and aft axis, a first modifying step is effected in which side portions are removed along vertical planes 20b (FIGURES 2, 2a, 2b) which pass through the short diagonal 20c of the front face of the prism and the lateral corners 20d of the rear face to leave a body of narrow delta shape in plan. In the second modifying step, portions are removed from the fore end of the body along planes 20e which meet on the long diagonal 20f (FIGURE 1) of the front face of the original prism and which diverge at equal angles to the horizontal plane of symmetry of the aircraft. In the third modifying step, as shown in FIGURES 4 to 4b, the nose 20g is turned to eliminate the surfaces 20e.

A forebody produced as just described has a form whereof the drag is calculable by Ward's slender body theory. (See Quarterly Journal of Mathematics and Applied Mechanics, vol. 2, 1949, pages 79 to 97, and the book "Linearised Theory of Steady High Speed Flow," G. M. Ward, published by Cambridge University Press, 1955.) Thus the tangent of the angle between each leading edge of the forebody and the fore and aft axis should not be more than about 0.4 times the tangent of the design Mach angle, and the ratio of the maximum forebody thickness to the root chord should not be more than about 0.1.

According to the present invention, the afterbody of an aircraft as just set forth should be designed to provide the greatest possible measure of transonic flow over its surfaces at the design Mach number.

A simple form of such an afterbody is shown in FIGURES 5 to 5b. This is achieved by drawing on each of the plane surfaces 20a, lines 21 which are, as viewed in plan, inclined to the fore and aft axis of the aircraft at an angle a equal to the Mach angle at the design Mach number and then removing material to leave plane surface 20h containing the line 21 and a line 22 extending from the point of intersection 23 of line 21 with the central vertical plane of the body to the point of intersection 24 of the diagonals of the original diamond rear end surface. The lines 21 thus define ridges forming the boundary between the forebody and afterbody, and the afterbody is afforded by four rearwardly-facing planes which meet the forebody in ridges inclined to the fore and aft axis of the aircraft at the design Mach angle. The superposed upper and lower plane surfaces 20h meet in trailing edges 25, and the pair of upper surfaces 20h (and likewise the lower pair) meet in the line 22 which clearly extends from the intersection 23 of the respective ridges 21 to a point on the fore and aft axis of the aircraft.

In order to reduce the turning angle at each ridge 21, the surface of the afterbody rearwards of each plane surface 20a may be formed in a number of rearwardly successive planes 26a, 26b, 26c etc. (FIGURES 6, 6a, 6b and 7 to 11), making successively greater angles to the plane 20a, of which the upstream plane 26a meets the plane surface 20a in the ridge line 21 and, each successive plane meets the plane next upstream in a ridge line 27 parallel to the ridge line 21.

In Figures 6 to 6b, each quarter of the afterbody surface is formed in two planes 26a, 26b, and in FIGURES 7 to 11, a large number of such successive surfaces 26a—26z are employed giving an afterbody shape as illustrated.

In both constructions it is ensured that the ridge lines 27 avoid the shockwave formed at the preceding ridge.

By employing a large number of such planes 26a etc. each quarter of the afterbody surface is a portion of a polyhedron and approximates as indicated in FIGURE 11 to a portion of a circular cylinder 29 touching the respective plane surface 20a of the forebody in the upstream ridge line 21.

Another form of aircraft which employs an afterbody developed from that shown in FIGURES 7 to 11, is shown in FIGURES 12 to 16. The basic outline of the afterbody is shown in chain lines in these figures. In this construction, the forebody 30 has a substantially circular section forwards developing into a lenticular section at transverse planes intersecting the ridge lines 21.

The afterbody 31 is slightly modified by the elimination of the cusp-like feature 32 of the basic profile and by the provision of lateral extension 34 which are faired into the forebody 30 and lead to two vertical banks 35 of jet propulsion engines.

I claim:

1. A supersonic narrow delta aircraft having a forebody and an afterbody, whereof the forebody is a prism of substantially diamond section adjacent its junction with the afterbody, said prism having four plane surfaces, said plane surfaces meeting in edges making angles to the fore and aft axis such that the ratio of the tangent of the angle to the tangent of the Mach angle is less than about 0.4, said forebody having a maximum thickness such that the ratio of the maximum thickness to the root chord is less than about 0.1, whereby the drag of the forebody is calculable by the linear theory, and the afterbody is defined by four corresponding plane surfaces continuing rearwardly from the plane surfaces of the adjacent portion of the forebody to a trailing edge of the aircraft, each plane of the afterbody intersecting the respective plane surfaces of the forebody in a corresponding ridge inclined to the fore and aft axis of the aircraft at the Mach angle, two of said plane surfaces forming the upper surface of the afterbody and meeting on a line extending from the intersection of the corresponding ridges to a point on the fore and aft axis of the aircraft, and the other two plane surfaces of the afterbody forming the lower surface of the afterbody and meeting on a line extending from the point of intersection of the corresponding ridges to said point on the fore and aft axis.

2. A supersonic narrow delta aircraft having a forebody and an afterbody whereof the forebody is a prism of substantially diamond-section adjacent its junction with the afterbody, said forebody having leading edges each making an angle to the fore and aft axis of the aircraft, which angle has a tangent less than about 0.4 times the tangent of the Mach angle, and said forebody having a maximum thickness less than about 0.1 of the root chord of the aircraft, whereby the drag of the forebody is calculable on the linear theory, and the afterbody has its surface formed in a plurality of rearwardly successive planes which meet one another in ridge lines making an angle to the aircraft fore and aft axis equal to the Mach angle, it being arranged that each ridge line does not intersect the preceding shockwave.

3. A supersonic narrow delta aircraft according to claim 2, wherein the number of such rearwardly successive planes is large, such that the afterbody approximates to one composed of four portions of a circular cylinder arranged so that each touches the respective plane surface of the forebody along a line making an angle to the fore and aft axis equal to the Mach angle.

4. An aircraft according to claim 2, there being an infinite number of said rearwardly successive planes whereby the afterbody has its surface composed of four portions of a circular cylinder arranged so that each touches the respective plane surface of the forebody along a line making an angle to the fore and aft axis equal to the Mach angle.

5. A supersonic narrow delta aircraft comprising a forebody and an afterbody, said forebody and afterbody having a common boundary which is the locus of the maximum thickness of the chordal profiles of the aircraft, said forebody being a prism of substantially diamond-section adjacent said boundary, said prism having four plane surfaces, and having leading edges inclined to the fore and aft axis of the aircraft at angles whereof the tangents are less than about 0.4 times the tangent of the Mach angle, and said forebody having a maximum thickness less than about 0.1 times the root chord of the aircraft, and said afterbody having its surface defined by four portions of a circular cylinder which touch the said four plane surfaces respectively, each portion of the circular cylinder touching its respective plane surface in a line which is inclined to the fore and aft axis at the Mach angle.

References Cited in the file of this patent

UNITED STATES PATENTS

| | | |
|---|---|---|
| D. 172,465 | Del Mar | June 22, 1954 |
| 2,511,502 | Gluhareff | June 13, 1950 |
| 2,532,753 | Beman | Dec. 5, 1950 |
| 2,874,922 | Whitcomb | Feb. 24, 1959 |
| 2,898,059 | Whitcomb | Aug. 4, 1959 |